United States Patent
Park et al.

(10) Patent No.: US 11,265,847 B2
(45) Date of Patent: Mar. 1, 2022

(54) METHOD FOR TRANSMITTING AND RECEIVING SIGNALS IN WIRELESS LAN SYSTEM AND APPARATUS THEREFOR

(71) Applicant: LG ELECTRONICS INC., Seoul (KR)

(72) Inventors: Sungjin Park, Seoul (KR); Kyungtae Jo, Seoul (KR); Jinmin Kim, Seoul (KR); Hangyu Cho, Seoul (KR); Kiseon Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 126 days.

(21) Appl. No.: 16/300,519

(22) PCT Filed: May 11, 2017

(86) PCT No.: PCT/KR2017/004868
§ 371 (c)(1),
(2) Date: Nov. 9, 2018

(87) PCT Pub. No.: WO2017/196091
PCT Pub. Date: Nov. 16, 2017

(65) Prior Publication Data
US 2019/0289576 A1 Sep. 19, 2019

Related U.S. Application Data

(60) Provisional application No. 62/413,996, filed on Oct. 28, 2016, provisional application No. 62/363,852, (Continued)

(51) Int. Cl.
*H04W 72/04* (2009.01)
*H04W 74/08* (2009.01)
*H04W 84/12* (2009.01)

(52) U.S. Cl.
CPC ........... *H04W 72/04* (2013.01); *H04W 74/08* (2013.01); *H04W 74/0808* (2013.01); *H04W 84/12* (2013.01)

(58) Field of Classification Search
CPC . H04W 72/04; H04W 74/08; H04W 74/0808; H04W 84/12; H04W 74/008; H04W 74/006
(Continued)

(56) References Cited

U.S. PATENT DOCUMENTS 9,698,947 B2 * 7/2017 Kwon .................. H04L 5/0007
2009/0103501 A1 * 4/2009 Farrag .................. H04W 74/02
370/337

(Continued)

FOREIGN PATENT DOCUMENTS

KR   1020140122429   10/2014
KR   1020160009484   1/2016

OTHER PUBLICATIONS

PCT International Application No. PCT/KR2017/004868, Written Opinion of the International Searching Authority dated Aug. 24, 2017, 18 pages.
(Continued)

*Primary Examiner* — Jeffrey M Rutkowski
*Assistant Examiner* — Luna Weissberger
(74) *Attorney, Agent, or Firm* — Lee Hong Degerman Kang Waimey

(57) ABSTRACT

The application relates to a method for transmitting and receiving, by a station, signals in a wireless LAN system and, more specifically, to a method for, when a station in a wireless LAN system is assigned one or more channels which do not include a primary channel on the system, setting and updating a network allocation vector (NAV) value applied to the one or more allocated channels, a
(Continued)

method for transmitting and receiving signals on the basis of the same, and an apparatus therefor.

4 Claims, 14 Drawing Sheets

Related U.S. Application Data filed on Jul. 19, 2016, provisional application No. 62/334,462, filed on May 11, 2016.

(58) Field of Classification Search
USPC ........................................................ 370/329
See application file for complete search history.

(56) References Cited

U.S. PATENT DOCUMENTS

| | | |
|---|---|---|
| 2013/0176980 A1 | 7/2013 | Kneckt et al. |
| 2013/0294394 A1* | 11/2013 | Kneckt ................. H04W 72/04 370/329 |
| 2014/0321379 A1 | 10/2014 | Seok et al. |
| 2016/0095110 A1* | 3/2016 | Li ..................... H04W 72/1215 370/329 |
| 2016/0113009 A1* | 4/2016 | Seok ................... H04B 7/0697 370/329 |
| 2017/0188336 A1* | 6/2017 | Ahn .................. H04W 72/0453 |
| 2017/0338935 A1* | 11/2017 | Ahn .................. H04W 72/0446 |

OTHER PUBLICATIONS

Park, S. et al., "Multi-Channel Operation in 11ay", doc.: IEEE 802.11-16/0401, Mar. 2016, 9 pages.

\* cited by examiner

| CH 1 | L - STF | L - CE | L - Header | ay Header A | ay STF | ay CE | ay Header B | ay payload |
|---|---|---|---|---|---|---|---|---|
|  | GF-STF | GF-CE |  |  |  |  |  |  |
| CH 2 | L - STF | L - CE | L - Header | ay Header A |  |  |  |  |

(L: legacy, GF: gap filling, ay: 802.11ay)

METHOD FOR TRANSMITTING AND RECEIVING SIGNALS IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2017/004868, filed on May 11, 2017, which claims the benefit of U.S. Provisional Application No. 62/334,462, filed on May 11, 2016, 62/363,852, filed on Jul. 19, 2016, and 62/413,996, filed on Oct. 28, 2016, the contents of which are all hereby incorporated by reference herein in their entirety.

TECHNICAL FIELD

The following description relates to an operating method of a station in a Wireless LAN (WLAN) system, and more particularly, to a method of if one or more channels failing to include a primary channel are allocated to a station in a WLAN system, configuring and updating a Network Allocation Vector (NAV) value applied to the one or more allocated channels, method of transmitting/receiving signals based on the same, and apparatus therefor.

BACKGROUND ART

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

Meanwhile, IEEE 802.11ad defines performance enhancement for high-speed throughput in the 60 GHz band, and IEEE 802.1 lay, for introducing channel bonding and MIMO technology to IEEE 802.11ad systems for the first time, is being discussed.

DISCLOSURE OF THE INVENTION

Technical Task

In an 11ay system to which the present invention is applicable, a station can transmit/receive a signal by receiving allocation of one or more channels. Here, a primary channel on a system may not be included in the one or more allocated channels.

In this case, since a Network Allocation Vector (NAV) value is not configured for the one or more allocated channels failing to include the primary channel, a method of configuring and updating the NAV value is newly proposed and a method of transmitting/receiving a signal based on the newly proposed method is proposed as well.

Technical Solutions

In one technical aspect of the present invention, provided herein is a method of transmitting a signal to a second Station (STA) by a first STA in a Wireless LAN (WLAN) system, the method including receiving information on one or more allocated channels not including a first channel from an Access Point (AP) through the first channel that is a primary channel, determining an initial value of a Network Allocation Vector (NAV) for the one or more allocated channels, and transmitting the signal to the second STA through the one or more allocated channels during a period having the one or more channels allocated therein based on the NAV.

In another technical aspect of the present invention, provided herein is a method of receiving a signal from a second Station (STA) by a first STA in a Wireless LAN (WLAN) system, the method including receiving information on one or more allocated channels not including a first channel from an Access Point (AP) through the first channel that is a primary channel, determining an initial value of a Network Allocation Vector (NAV) for the one or more allocated channels, and receiving the signal from the second STA through the one or more allocated channels during a period having the one or more channels allocated therein based on the NAV.

In further technical aspect of the present invention, provided herein is a station transmitting a signal in a Wireless LAN (WLAN) system, the station including a transceiving unit configured to transceive the signal with a different station by having one or more Radio Frequency (RF) chains and a processor configured to process the signal transceived with the different station by being connected to the transceiving unit, wherein the processor is further configured to receive information on one or more allocated channels not including a first channel from an Access Point (AP) through a first channel that is a primary channel, determine an initial value of a Network Allocation Vector (NAV) for the one or more allocated channels, and transmit the signal to the different station through the one or more allocated channels during a period having the one or more channels allocated therein based on the NAV.

In another further technical aspect of the present invention, provided herein is a station receiving a signal in a Wireless LAN (WLAN) system, the station including a transceiving unit configured to transceive the signal with a different station by having one or more Radio Frequency (RF) chains and a processor configured to process the signal transceived with the different station by being connected to the transceiving unit, wherein the processor is further configured to receive information on one or more allocated channels not including a first channel from an Access Point (AP) through a first channel that is a primary channel, determine an initial value of a Network Allocation Vector (NAV) for the one or more allocated channels, and receive the signal from the different station through the one or more allocated channels during a period having the one or more channels allocated therein based on the NAV.

Preferably, the initial value of the NAV comprises an NAV value set for the first channel immediately before (or right before) the one or more channels allocated period.

More preferably, the station may further receive a second channel operating as an alternative primary channel during the one or more channels allocated period among the one or more allocated channels from the AP and update the NAV using the second channel during the one or more channels allocated period.

And, the station may further perform physical carrier sensing including energy detection based Clear Channel Assessment (CCA) and virtual carrier sensing based on the NAV with reference to the second channel during the one or more channels allocated period.

Moreover, the station may further perform the physical carrier sensing only on a channel that is not the second channel among the one or more allocated channels during the one or more channels allocated period.

Preferably, the signal transmission/reception to/from the different station (e.g., second STA) may be performed if the NAV value becomes 0.

Preferably, the information on the one or more allocated channels may be transmitted through a beacon frame, an announcement frame or a grant frame.

Advantageous Effects

Through the above-described configuration, although one or more channels not including a primary channel are allocated to a station according to the present invention, the station can perform signal transmission/reception without collision with another station during a period having the one or more channels allocated therein.

The effects that may be obtained by the present invention are not limited to the above-mentioned effects, and other effects not mentioned above will be clearly understood by those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, a detailed description will be given of the introduction of the concept of a downlink oriented channel, and a method and apparatus for conducting communication using a downlink oriented channel in a high-density Wireless Local Area Network (WLAN) system.

1. Wireless LAN (WLAN) System 1.1. Generals of WLAN System

Figure 1:
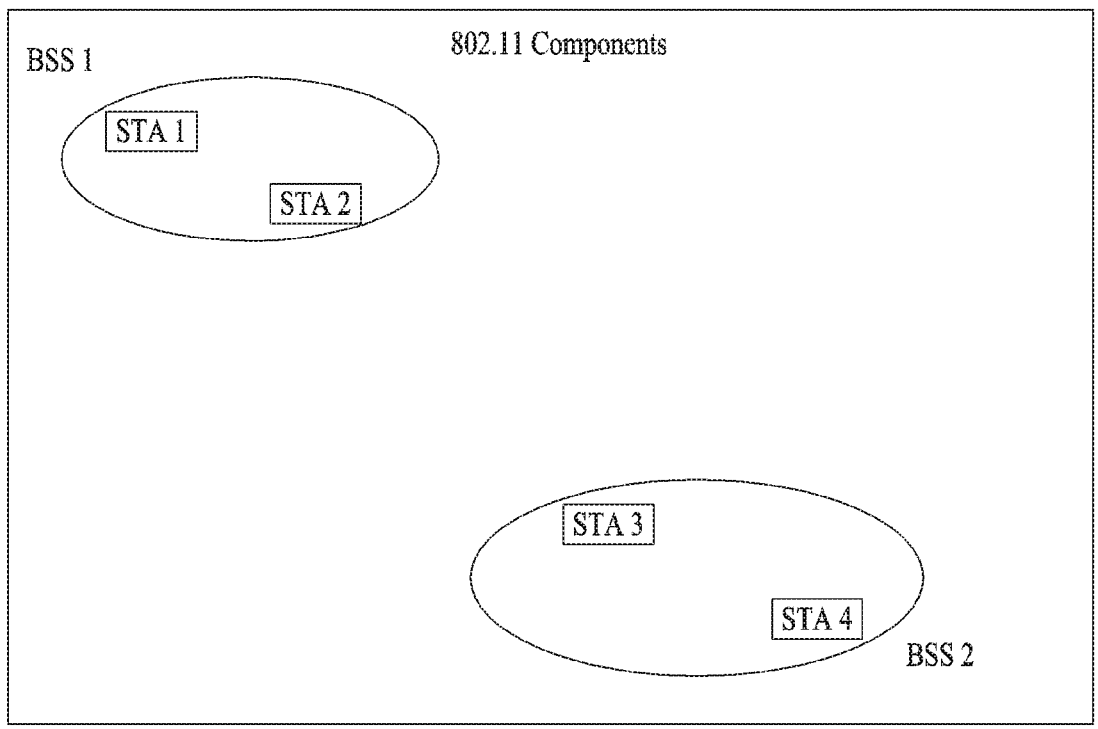
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBS S).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
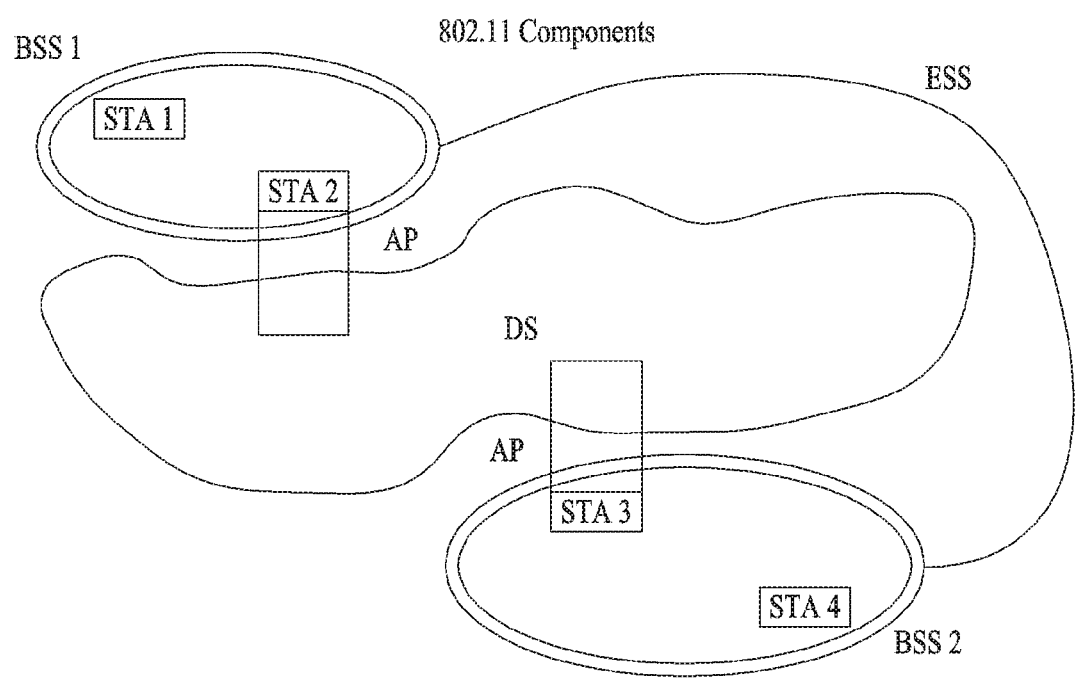
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above, a method of channel bonding in the WLAN system will be described.

1.2 Channel Bonding in WLAN System

Figure 3:
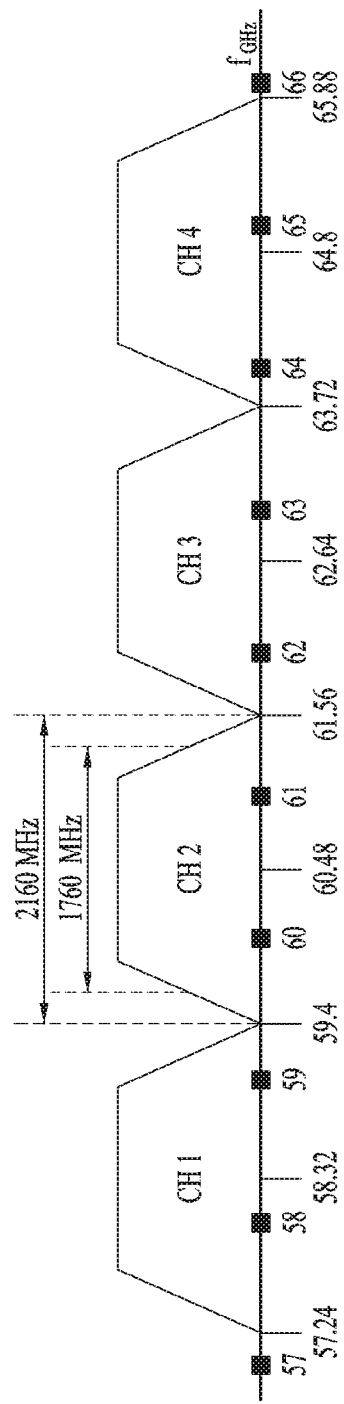
FIG. 3 is a diagram illustrating a channel in a 60 GHz band for explaining a channel bonding operation according to an embodiment of the present invention.

FIG. 3 is a diagram illustrating a channel in a 60 GHz band for explaining a channel bonding operation according to an embodiment of the present invention.

As shown in FIG. 3, four channels may be configured in the 60 GHz band, and the typical channel bandwidth may be 2.16 GHz. The ISM band (57 GHz to 66 GHz) available at 60 GHz may be specified differently for different countries. In general, channel 2 of the channels shown in FIG. 3 is available in all regions and may be used as a default channel. Most of the regions, except Australia, may use channels 2 and 3, which may be utilized for channel bonding. However, the channels used for channel bonding may vary, and the present invention is not limited to a specific channel FIG. 4 illustrates a basic method of performing channel bonding in a WLAN system.

Figure 4:
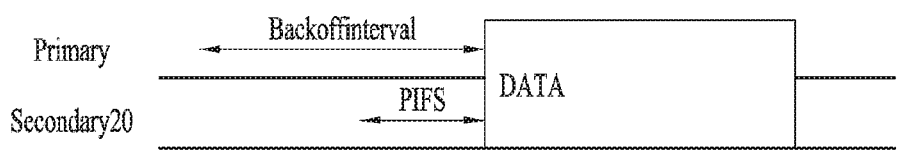
FIG. 4 illustrates a basic method of performing channel bonding in a WLAN system.

The example of FIG. 4 illustrates the operation of 40 MHz channel bonding performed by combining two 20 MHz channels in the IEEE 802.11n system. For IEEE 802.11ac, 40/80/160 MHz channel bonding may be performed.

The two channels exemplarily shown in FIG. 4 include a primary channel and a secondary channel, and the STA may review the channel status of the primary channel of the two channels in the CSMA/CA manner. If the secondary channel is idle for a predetermined time (e.g., PIFS) while the primary channel is idle during a certain backoff interval and the backoff count becomes 0, the STA may transmit data by bonding the primary channel and the secondary channel In the case where channel bonding is performed based on contention as shown in FIG. 4, channel bonding is allowed only when the secondary channel remains idle for a predetermined time at the time when the backoff count for the primary channel expires, and therefore the application of channel bonding is very limited, and it is difficult to flexibly cope with the media situation.

Accordingly, in one aspect of the present invention, an AP may transmit scheduling information to STAs to perform access based on scheduling. Meanwhile, in another aspect of the present invention, channel access may be performed based on the above-described scheduling or on contention independently of the above-described scheduling. In yet another aspect of the present invention, communication may be performed based on beamforming using a spatial sharing technique.

1.3. Beacon Interval Configuration

Figure 5:
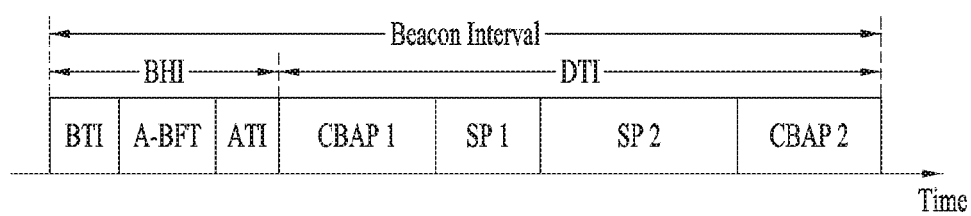
FIG. 5 is a diagram illustrating configuration of a beacon interval.

FIG. 5 is a diagram illustrating configuration of a beacon interval.

In 11ad-based DMG BSS systems, the media time may be divided into beacon intervals. The sub-intervals within a beacon interval may be referred to as access periods. Different access intervals within one beacon interval may have different access rules. The information on the access intervals may be transmitted to a non-AP STA or a non-PCP by the AP or Personal Basic Service Set Control Point (PCP).

As shown in FIG. 5, one beacon interval may include one beacon header interval (BHI) and one data transfer interval (DTI). The BHI may include a beacon transmission interval (BTI), an association beamforming training (A-BFT) interval, and an announcement transmission interval (ATI) as shown in FIG. 5.

The BTI refers to an interval during which one or more DMG beacon frames may be transmitted. The A-BFT interval refers to an interval during which beamforming training is performed by an STA that has transmitted the DMG beacon frame during the preceding BTI. The ATI refers to a request-response-based management access interval between a PCP/AP and a non-PCP/non-AP STA.

Meanwhile, the data transfer interval (DTI) is an interval during which frame exchange is performed between STAs, and may be allocated one or more Contention Based Access Periods (CBAPs) and one or more service periods (SPs) as shown in FIG. 5. Although FIG. 5 illustrates an example of allocation of two CBAPs and two SPs, this is illustrative and not restrictive.

Hereinafter, the physical layer configuration in a WLAN system to which the present invention is applied will be described in detail.

1.4. Physical Layer Configuration

It is assumed that the following three different modulation modes may be provided in the WLAN system according to an embodiment of the present invention.

TABLE 1

| PHY | MCS | Note |
| --- | --- | --- |
| Control PHY | 0 | |
| Single carrier PHY (SC PHY) | 1 . . . 12 25 . . . 31 | (low power SC PHY) |
| OFDM PHY | 13 . . . 24 | |

Such modulation modes may be used to satisfy different requirements (e.g., high throughput or stability). Depending on the system, only some of these modes may be supported.

Figure 6:
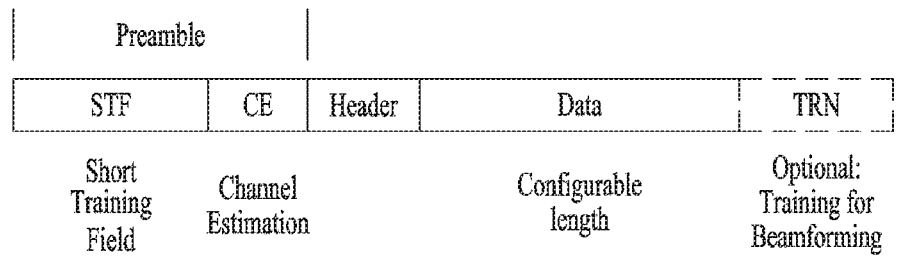
FIG. 6 is a diagram illustrating a physical configuration of an existing radio frame.

FIG. 6 is a diagram illustrating a physical configuration of an existing radio frame.

It is assumed that all the Directional Multi-Gigabit (DMG) physical layers include fields as shown in FIG. 6 in common. However, depending on the respective modes, physical layers may have a different method of defining individual fields and use a different modulation/coding scheme.

As shown in FIG. 6, the preamble of a radio frame may include a Short Training Field (STF) and Channel Estimation (CE). In addition, the radio frame may include a header and a data field as payload, and selectively include a TRN (Training) field for beamforming.

Figure 7:
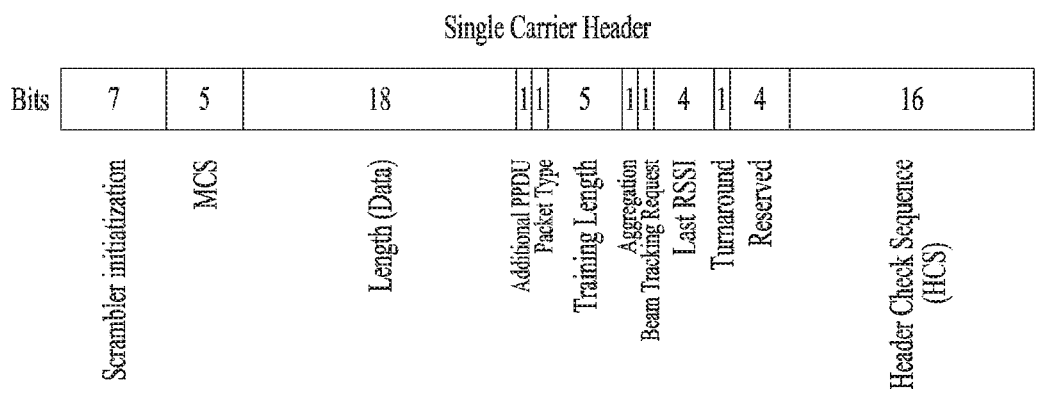
FIGS. 7 and 8 are diagrams illustrating configuration of the header field of the radio frame of FIG. 6.
Figures 8, 9:
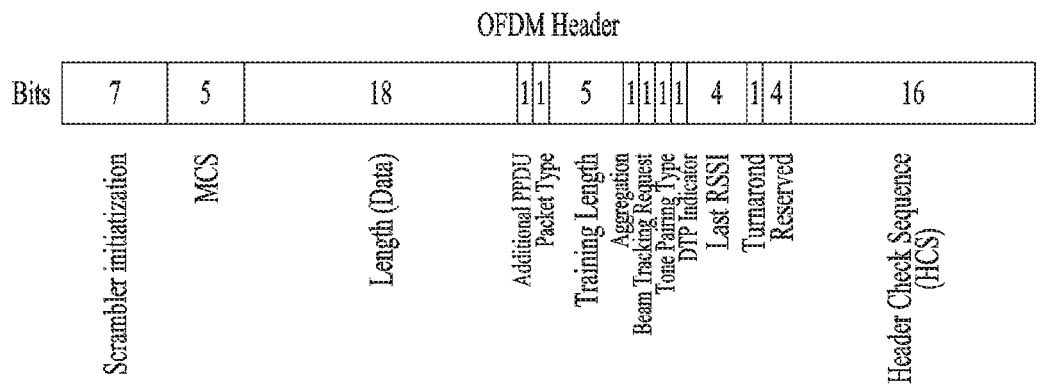
FIG. 9 is a diagram showing a PPDU structure applicable to the present invention.

FIGS. 7 and 8 are diagrams illustrating configuration of the header field of the radio frame of FIG. 6.

Specifically, FIG. 7 illustrates a case where a Single Carrier (SC) mode is used. In the SC mode, the header may include information indicating an initial value of scrambling, a Modulation and Coding Scheme (MCS), information indicating the length of data, information indicating the presence or absence of an additional Physical Protocol Data Unit (PPDU), a packet type, a training length, an aggregation status, a beam training request status, a last Received Signal Strength Indicator (RSSI), a truncation status, and a Header Check Sequence (HCS). In addition, as shown in FIG. 7, the header has 4 reserved bits. The reserved bits may be utilized in the following description.

FIG. 8 specifically illustrates configuration of a header in a case where the OFDM mode is applied. The OFDM header may include information indicating an initial value of scrambling, an MCS, information indicating the length of data, information indicating the presence or absence of additional PPDU, a packet type, a training length, an aggregation status, a beam training request status, a last RSSI, a truncation status, and an HCS. In addition, as shown in FIG. 8, the header has 2 reserved bits. The reserved bits may be utilized in the following description as in the case of FIG. 7.

As described above, the IEEE 802.11 ay system is considering introduction of channel bonding and MIMO technology in the legacy 11ad system for the first time. In order to implement channel bonding and MIMO in 11ay, a new PPDU structure is needed. In other words, the existing 11ad PPDU structure has limitations in supporting legacy UEs and implementing channel bonding and MIMO.

For this, a legacy preamble for supporting a legacy UE and a new field for an 11ay UE following a legacy header field may be defined, and channel bonding and MIMO may be supported through the newly defined field.

FIG. 9 is a diagram showing a PPDU structure according to a preferred embodiment of the present invention. In FIG. 9, the abscissa may correspond to the time domain, and the ordinate may correspond to the frequency domain.

When two or more channels are bonded, a frequency band (for example, a 400 MHz band) may exist between frequency bands (e.g., 1.83 GHz) used in the respective channels. In the mixed mode, a legacy preamble (legacy STF, legacy CE) is transmitted in duplicate through each channel. In an embodiment of the present invention, transmitting the new STF and CE field (gap filling) preamble through the 400 MHz band between the channels along with transmission of the legacy preamble may be considered.

In this case, as shown in FIG. 9, in the PPDU structure according to the present invention, ay STF, ay CE, ay header B, and payload are transmitted over broadband after a legacy preamble, a legacy header and an ay header A. Therefore, the ay header, ay Payload field, and the like to be transmitted after the header field may be transmitted through channels used for bonding. In order to distinguish the ay header from the legacy header, the ay header may be referred to as an enhanced directional multi-gigabit (EDMG) header, or "ay header" and "EDMG header" may be interchangeably used.

For example, a total of six or eight channels (2.16 GHz) may be present in 11ay, and up to four channels may be bonded and transmitted to a single STA. Thus, the ay header and the ay payload may be transmitted over bandwidths of 2.16 GHz, 4.32 GHz, 6.48 GHz, and 8.64 GHz.

Alternatively, the PPDU format used when the legacy preamble is repeatedly transmitted without performing the gap-filling described above may also be considered.

In this case, the gap-filling is not performed, and thus the ay STF, ay CE, and ay header B are transmitted in a wideband after the legacy preamble, legacy header, and ay header A, without the GF-STF and GF-CE field indicated by the dotted line in FIG. 9.

Figure 10:
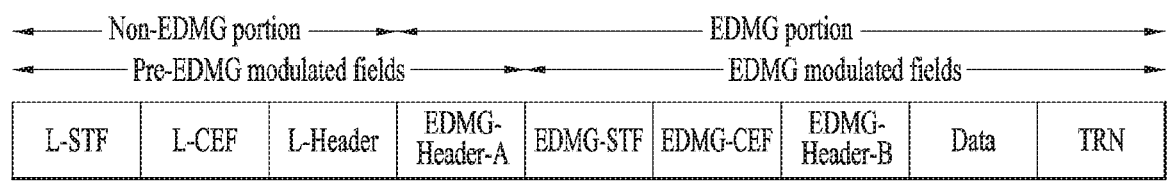
FIG. 10 is a diagram simply illustrating a PPDU structure applicable to the present invention.

FIG. 10 is a diagram simply illustrating a PPDU structure applicable to the present invention. The aforementioned PPDU format can be summarized as FIG. 10.

As shown in FIG. 10, a PPDU format applicable to 11ay system can include such a field as L-STF, L-CEF, L-Header, EDMG-Header-A, EDMG-STF, EDMG-CEF, EDMG-Header-B, Data, and TRN field. The above fields can be selectively included according to a form (e.g., SU PPDU, MU PPDU, etc.) of a PPDU.

In this case, a portion including the L-STF, the L-CEF, and the L-header fields can be referred to as a non-EDMG portion and the remaining portion can be referred to as an EDMG portion. And, the L-STF, the L-CEF, the L-Header, and the EDMG-Header-A fields can be referred to as pre-EDMG modulated fields and the remaining portion can be referred to as an EDMG modulated field.

2. Multi-Channel Operation Applicable to Present Invention 2.1 Scheduling Through Beacon or Announcement Frame Based on the above-mentioned items, if one or more channels are allocated to an 11ay STA or a primary channel is not included in the one or more channels, an operating method of the 11ay STA and a PCP/AP according to the present invention is described in detail. The '11ay STA' mentioned in the detailed description of the present invention means a device (e.g., UE, station, access point, etc.) supportive of the 802.11ay system proposed by the present invention, and can be further interpreted as a device capable of implementing all the features proposed by the present invention despite operating on the basis of another system. Thus, the following description shall be made using '11ay STA' as an expression for commonly calling devices having the above-mentioned features.

Figure 11:
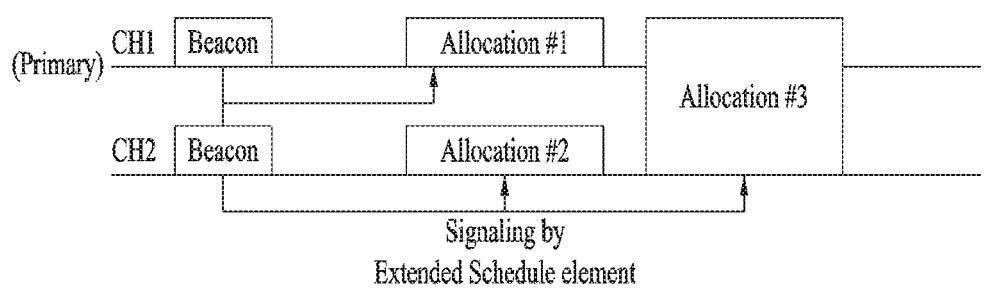
FIG. 11 and FIG. 12 are diagrams showing a multi-channel operation according to the present invention.
Figure 12:
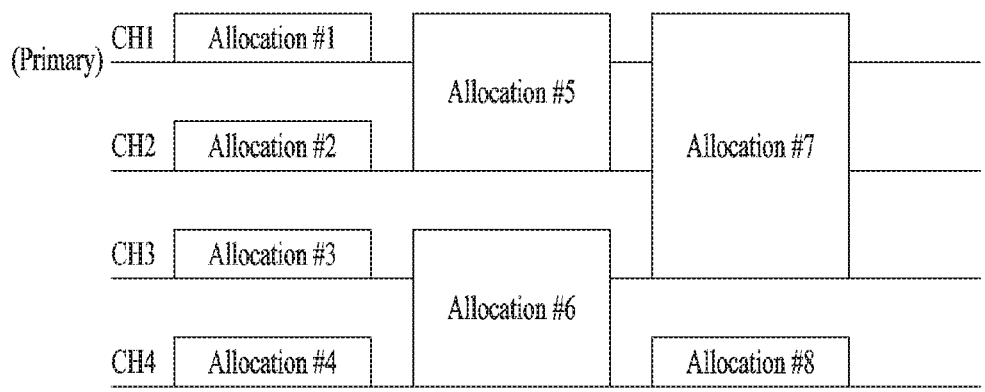

FIG. 11 and FIG. 12 are diagrams showing a multi-channel operation according to the present invention.

Referring to FIG. 11, an STA can receive allocation of periods of Allocations #1 to #3 through a beacon or announcement message. The beacon message may be transmitted on CH2 (i.e., secondary channel) as well as on CH1 (i.e., primary channel). Yet, in order to reduce overhead of a signal, the beacon message may be transmitted only on CH1 that is a primary channel of a system. Here, Allocations #1 to #3 mean allocation periods allocated to STAs, respectively. CBAP or SP may be applicable as the allocation period depending on an embodiment. In FIG. 12, Allocations #1 to #8 may mean allocation periods allocated to STAs, respectively. And, each of the allocation periods may become CBAP or SP.

In this case, one or more of a plurality of channels provided by the system may be allocated to each STA depending on a channel bonding ability or a channel environment of each STA. And, a primary channel of the system may not be included in the one or more channels. Here, total 6 or 8 channels are applicable as a plurality of the channels.

Yet, if one or more channels not including a primary channel like Allocation #2 of FIG. 11 and Allocations #2 to

4, #6, #8 and the like of FIG. 12 are allocated to STAs, the STAs are unable to use CH1 that is the primary channel on the system. Hence, it is necessary to configure a separate channel to use as a primary channel during a period in which the one or more channels are allocated. Thus, a PCP/AP of the present invention can transmit information, which designates a separate channel usable as a primary channel by the STAs to which the one or more channels not including CH1 (i.e., primary channel) are allocated during the period in which the one or more channels are allocated, to each of the STAs. Here, the separate channel usable as the primary channel during the one or more channels allocated period can be designated as one of the one or more channels.

Hence, each STA can use CH1 that is the primary channel on the system or the separate channel as the primary channel during the one or more channels allocated period. For example, an STA to which channels like Allocation #2 of FIG. 11 and Allocations #2 to #4, #6, #8 and the like of FIG. 12 are allocated can decode a preamble part of a PPDU frame not through CH1 but through a newly designated primary channel during an allocation period. Or, if the allocation periods are CBAP, the STA can perform a backoff operation not through CH1 but through the newly designated primary channel during the allocation period.

Moreover, like Allocation #6 of FIG. 12, an STA to which a plurality of channels not including a primary channel (e.g., CH1) of a system are allocated can transceive data with another STA by combining a plurality of the channels with reference to a newly designated primary channel instead of the primary channel (e.g., CH1) of the system during a period in which a plurality of the channels are allocated.

For such an operation, a PCP/AP or STA can provide information on a bandwidth allocated to each STA, an alternative primary channel operating as a primary channel during an allocated period and the like through a management frame (a beacon frame or an association frame), an announcement frame and the like.

Figure 13:
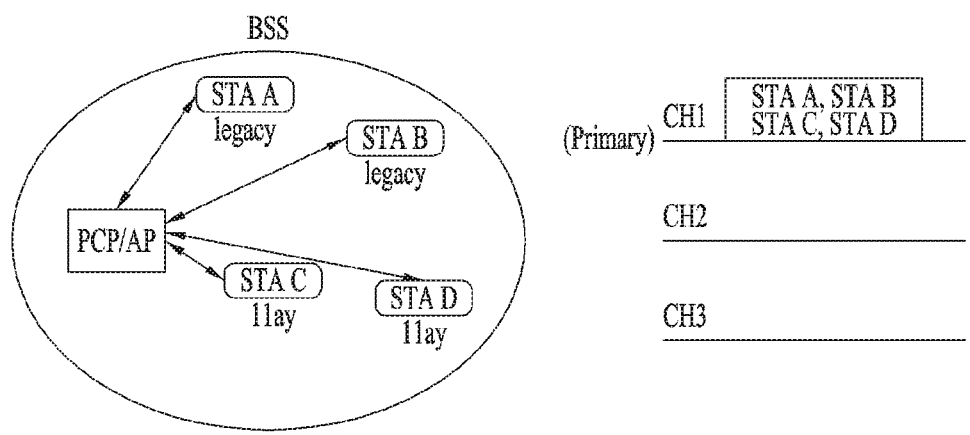
FIGS. 13 to 15 are diagrams showing an operation of receiving allocation of a channel through signal transmission/reception in a single BSS.
Figure 14:
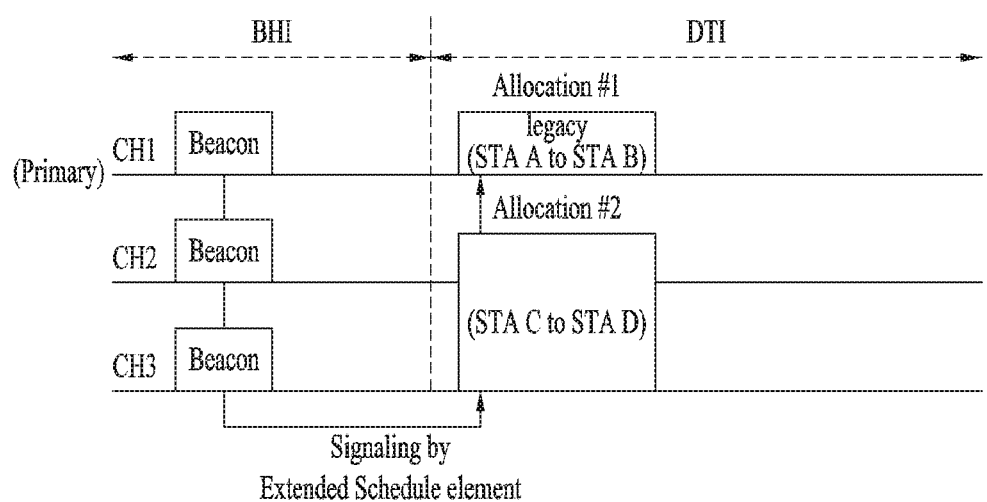
Figure 15:
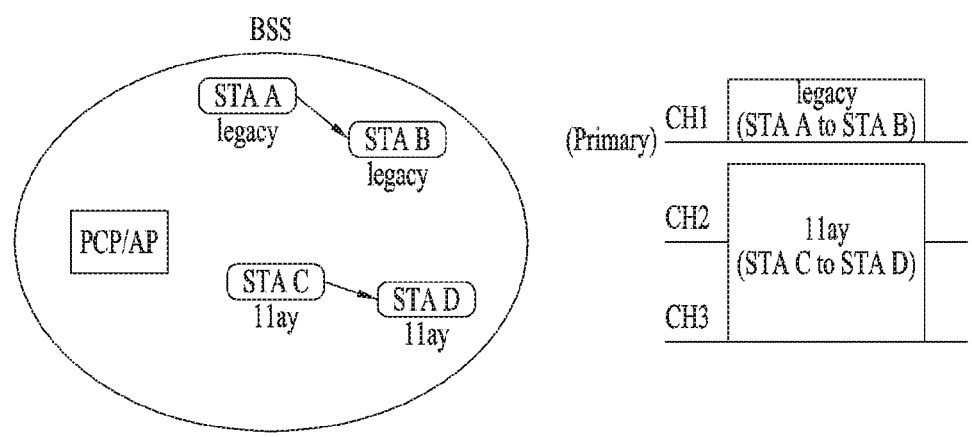

In the following, when an STA according to the present invention and an STA supported by a legacy 11ad system coexist in a single BSS, a corresponding operation is described. In FIGS. 13 to 15, an STA supported by the 11ad system is represented as 'legacy' and an STA according to the present invention is represented as '11ay'. Hence, STA A or STA B is represented as legacy STA, and STA C or STA D is represented as 11ay STA.

Referring to FIG. 13, in a BSS establishing or associating process, a legacy STA and an 11ay STA establish a BSS in a manner of using a primary channel supported by a system as an operation channel.

The legacy STA establishes a link to a PCP/AP through a DMG operation element and a DMG capability element. On the other hand, the 11ay STA can establish a link to the PCP/AP by modifying reserved bits included in a DMG operation element and a DMG capability element defined in an existing system or newly defining an EDMG operation element and an EDMG capability element.

Through a corresponding negotiation procedure, the PCP/AP can check whether the 11ay STA can support a multi-channel operation.

And, the 11ay STA can receive information on a primary channel and secondary channels through a DMG operation element and an EDMG capability element in the course of establishing the link to the PCP/AP.

Referring to FIG. 14, a PCP/AP can allocate one or more channels to each STA through an extended schedule element after establishing a link to each STA. For example, CH1 that is a primary channel preset on a system can be allocated to a legacy STA and CH2 and CH3 except CH1 can be allocated to an 11ay STA to prevent collision with the legacy STA.

In doing so, since the CH1 that is the primary channel preset on the system is not included in the channels allocated to the 11ay STA, the PCP/AP can provide the 11ay STA with information designating a channel to use as a primary channel during a period in which CH2 and CH3 are allocated. As a method for this, it is able to use reserved bit information in an allocation control subfield, which is included in each allocation field within an extended schedule element, or separate bit information.

Referring to FIG. 15, during DTI, an 11ay STA and legacy STAs transmit/receive data or frames through allocated channels, respectively. For example, STA A (i.e., legacy STA) can transmit data to STA B on CH1 and STA C (i.e., 11ay STA) can transmit data to STA D on CH2 and CH3. In doing so, if one of CH2 and CH3 is busy, the STA C may transmit data using one of the channels only.

Here, the STA C (i.e., hay STA) uses CH2 or CH3 as a primary channel during the allocation period shown in FIG. 15. For example, if a PCP/AP transmits information, which designates CH2 as a primary channel during the allocation period, to the STA C, the STA C can transmit data to the STA D by combining CH2 and CH3 together with reference to the CH2. Moreover, if a period allocated to the STA C is CBAP, the STA C can perform backoff using CH2 and decode a preamble of a PPDU frame.

Additionally, if the STA C transmits data to the STA D, AID of the STA C is included in a source AID subfield in a specific allocation field of an extended schedule element transmitted by the PCP/AP to the STA C and the STA D and AID of the STA D may be included in a destination AID field. Here, broadcast AID may be applicable to each AID subfield, or group ID of each STA may be applicable thereto.

At the same time, an allocation type in the allocation control field within the specific allocation field may indicate whether the period allocated to the STA C and the STA D is CBAP or SP.

2.2. Dynamic allocation Through Grant Frame

Described in detail in the following is a method that a PCP/AP or a separate STA having dynamic allocation capability dynamically allocates one or more channels during a Data Transmission Interval (DTI) by transmitting a grant frame to one or more STAs.

In this case, since a legacy STA is unable to decode a grant frame proposed by the present invention or a newly proposed field in the grant frame, a channel can be allocated as a primary channel only to the legacy STA. Moreover, channels not including a primary channel on a system can be allocated to an STA (e.g., 11ay STA) supportive of an 11ay system proposed by the present invention by decoding a grant frame proposed by the present invention. For clarity of the following description, a station capable of performing an operation proposed by the present invention shall be named an 11ay STA.

Figure 16:
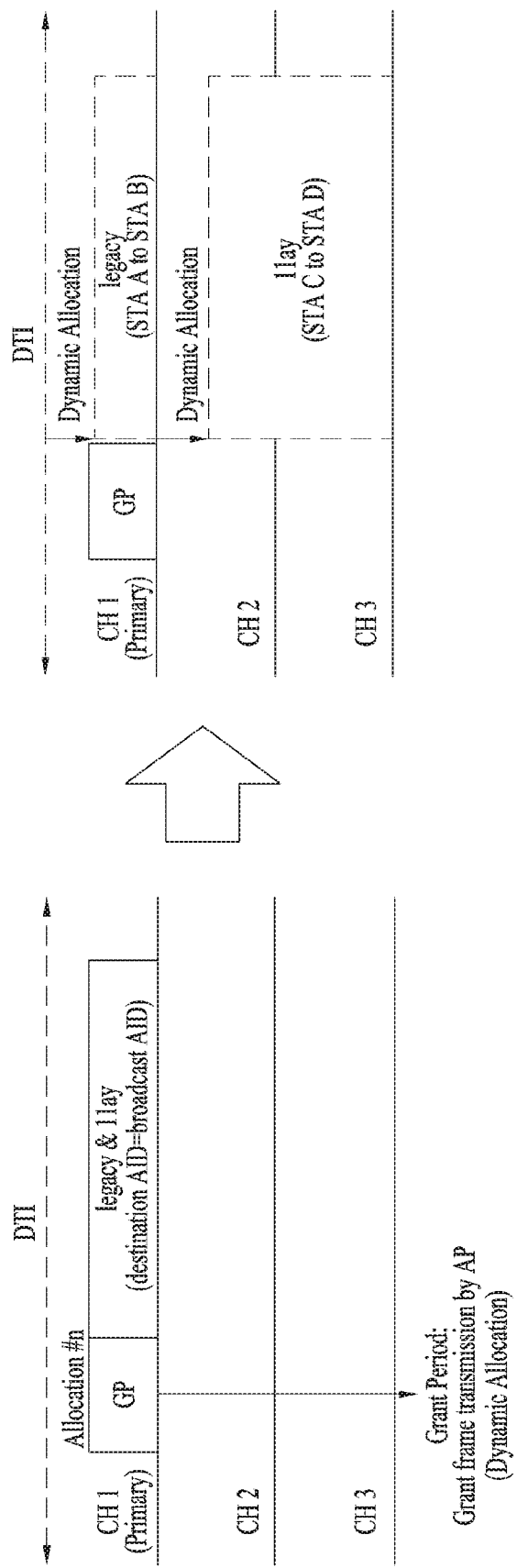
FIG. 16 is a diagram schematically showing an operation of dynamically allocating one or more channels through a grant frame according to one embodiment of the present invention.

FIG. 16 is a diagram schematically showing an operation of dynamically allocating one or more channels through a grant frame according to one embodiment of the present invention.

Referring to FIG. 16, a PCP/AP or a separate STA transmits a grant frame to one or more STAs during a DTI, thereby dynamically allocating an allocation period of a predetermined length to the one or more STAs during the DTI.

In case of the aforementioned scheduling operation through a beacon or announcement frame, the PCP/AP performs a scheduling operation during DTI after BHI through a beacon or announcement frame transmitted during the BHI. In doing so, since the beacon or announcement frame is transmitted during the BHI only, limitation is put on dynamically controlling a scheduling during the DRI.

On the other hand, as the grant frame is transmitted during the DTI, it is able to allocate an allocation period of a predetermined length to one or more STAs. Thus, the grant frame enables flexible channel allocation in comparison with the beacon or announcement frame.

Hereinafter, a period in which the grant frame is transmitted shall be named Grant Period (GP). Hence, the GP is included in the DTI. As shown in FIG. 16, the GP may be included in a single allocation period configured through the beacon or announcement frame.

As a further embodiment, the GP may be included in ATI included in BHI. For more flexible channel allocation, the GP may be preferably included in the DTI.

The grant frame may be transmitted on CH1 that is a primary channel on a system. And, after reception of the grant frame, an allocation period of a predetermined length may be allocated to one or more STAs having received the grant frame.

To this end, the PCP/AP or the separate STA may broadcast a destination AID value of the grant frame to STAs located nearby by being configured as a broadcast AID. This is just one example According to an embodiment, the destination AID value may be set as an AID of an STA to which the grant frame will be transmitted or a specific group AID or a partial AID.

Furthermore, as an 11ay system proposed by the present invention supports a multi-channel operation, a plurality of dynamic allocation periods may be allocated through a single Grant Period (GP). To this end, the following methods can be considered.

(1) A PCP/AP or a separate STA transmits a plurality of dynamic allocation informations according to the number of dynamic allocations within a specific GP. To this end, the PCP/AP or the separate STA may transmit a plurality of grant frames through the GP.

For example, information on a first allocation is included in a first grant frame transmitted by a PCP/AP or a separate STA. Here, the PCP/AP or the separate STA may transmit the first grant frame to a source STA only or transmit a grant frame including information on the first allocation to both of a source STA and a destination STA by transmitting the grant frame twice. And, information on a second allocation may be included in a second grant frame transmitted by the PCP/AP or the separate STA.

Thus, a PCP/AP or a separate STA may transmit a grant frame to a source STA and/or a destination STA per allocation, and the number of grant frames transmitted per allocation can be configured independently.

(2) A plurality of allocations are performed by forming a GP amounting to the number of dynamic allocations.

A legacy GP defined in the related art 11ad system is maintained, and one or more GPs for an 11ay system can be formed separately in continuation with the legacy GP. Hence, a PCP/AP or a separate STA can perform dynamic channel allocation on an 11ay STA through the separately formed GP.

Moreover, a PCP/AP or a separate STA can allocate CBAP or SP to one or more STAs through a grant frame. In this case, both an individual grant frame and a broadcast frame are applicable.

Having received a grant frame through CH1 that is a primary channel configured on a system, a legacy or 11ay STA decodes the grant frame and determines whether dynamic allocation information on each STA is included in the grant frame. Subsequently, if dynamic allocation information on a specific STA is included in the grant frame, the specific STA can transceive data or signals with another STA during an allocation period indicated by the dynamic allocation information through one or more channels indicated by the dynamic allocation information.

In particular, a legacy STA (e.g., STA A or STA B in FIG. 15) operating on a primary channel only may receive allocation of a dynamic allocation period of a predetermined length after a GP through the grant frame and transceive signals mutually during the dynamic allocation period.

Or, an 11ay STA (e.g., STA C or STA D in FIG. 15) capable of operating on a plurality of channels may receive allocation of CH2 and CH3 that are not primary channels through the grant frame and transceive signals mutually during a dynamic allocation period indicated by the grant frame by bonding or aggregating the CH2 and the CH2 together.

Figure 17:
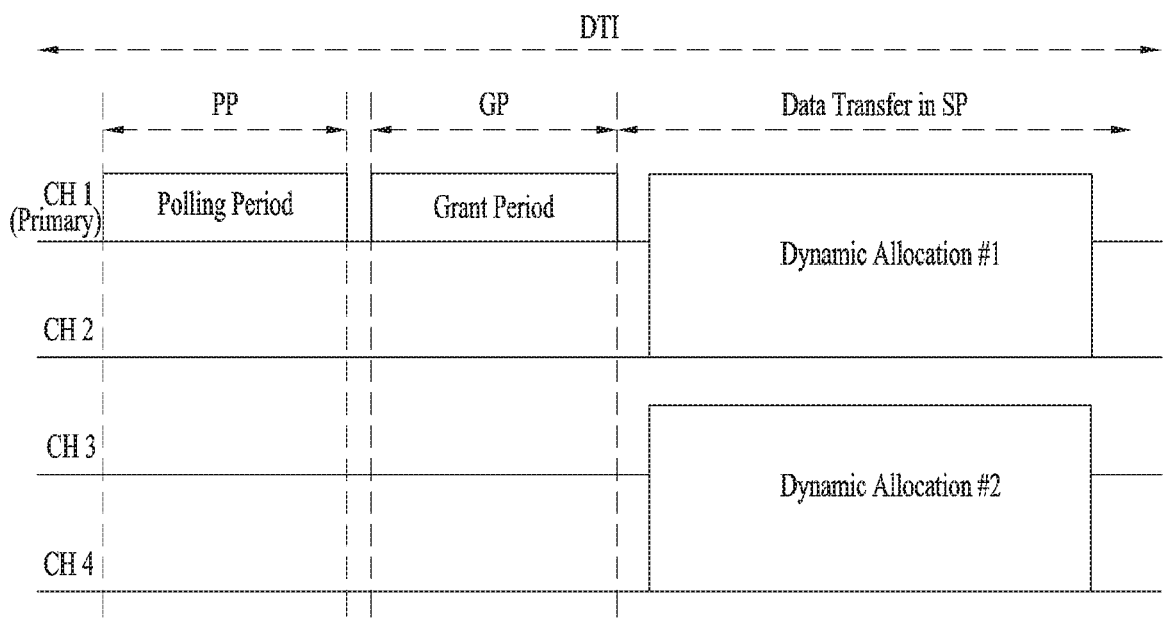
FIG. 17 is a diagram schematically showing an operation of dynamically allocating one or more channels through a grant frame according to another embodiment of the present invention.

FIG. 17 is a diagram schematically showing an operation of dynamically allocating one or more channels through a grant frame according to another embodiment of the present invention.

Referring to FIG. 17, a DTI according to the present invention may be mainly divided into a Polling Period (PP), a Grant Period (GP) and an allocation period.

A polling period means a period in which a PCP/AP or a separate STA conducts a poll on a presence or non-presence of dynamic allocation in DTI by transmitting a poll frame to one or more stations and then receives a Service Period Request (SPR) frame from the one or more STAs. In doing so, the PCP/AP or the separate STA may transmit different poll frames to the one or more STAs and receive SPR frames corresponding to the different poll frames from the one or more STAs, respectively.

As described above, a specific STA having received the poll frame from the PCP/AP or the separate STA may transmit an SPR frame to the PCP/AP or the separate STA in response to the poll frame.

Moreover, it is not mandatory for the one or more STAs having received the poll frame to perform the transmission of the SPR frame. And, whether to transmit the SPR frame may be determined according to a selection made by the one or more STAs.

An allocation period means a period in which data is transmitted/received using one or more channels during a channel period dynamically allocated through the grant frame. Particularly, the allocation period may mean one of: (1) a period for transceiving data through a primary channel on a system; (2) a period for transceiving data not through a primary channel on a system but through another channel; (3) a period for transceiving data through a plurality of channels including a primary channel on a system; and (4) a period for transceiving data through a plurality of channels that are not a primary channel on a system. Here, as a method of transceiving data through a plurality of channels, one of an operation of transceiving data by bonding a plurality of the channels, an operation of transceiving data by aggregating a plurality of the channels and the like is applicable.

3. Network Allocation Vector (NAV) Configuring Method Proposed by the Present Invention Described in detail in the following is an NAV configuring method in case of allocating multiple channels, and more particularly, channels not including a primary channel on a system to a single STA through the aforementioned methods.

First of all, in a situation that a multitude of STAs exist in a single BSS through the aforementioned various methods, a PCP/AP can allocate a channel used for data transmission/reception to the STAs.

Before the channel is allocated, all the STAs in the BSS exchange information on control and information on management with the PCP/AP through a primary channel. If the PCP/AP has a multi-channel or wide bandwidth capability, the PCP/AP can transmit/receive the informations using one or more secondary channels instead of the primary channel.

As shown in FIG. 13, a PCP/AP and an STA according to the present invention can transceive signals through a primary channel during a BHI. Here, an STA A or STA B denoted by legacy can be replaced by an 11ay UE depending on an embodiment.

Moreover, as described above, a grant frame can be transmitted through a primary channel in a DTI before performing channel allocation.

After channel allocation has been performed, each STA can utilize a channel allocated like FIG. 15.

Subsequently, each STA can perform an access to a specific channel using an NAV. In doing so, each STA can perform full carrier sensing including physical carrier sensing and virtual carrier sensing on the specific channel.

Here, the NAV is a configuration for the virtual carrier sensing. Until an NAV value for the specific channel becomes 0, each STA can stand by for a channel access (or signal transmission/reception) by regarding that the corresponding channel will be occupied by another node. For example, the NAV value can be determined based on information included in an RTS/CTS frame header in a Ready To Send/Clear To Send (RTS/CTS) exchange procedure.

Yet, as described above, a signal (e.g., beacon/announcement/grant frame. Etc.) including information on a channel allocated to each STA is provided through a primary channel on a system. On the other hand, in an 11ay system to which the present invention is applicable, as a multi-channel operation is supported, one or more channels not including the primary channel can be allocated to a specific STA. In this case, the specific STA may be confused in determining what kind of NAV value should be applied to the one or more channels not including the primary channel.

Therefore, in such a case, in order to prevent signal transmission collision between the specific STA and other STAs, the present invention proposes how to configure NAV for an allocated channel not including a primary channel. As a detailed example of this, an example of allocating a channel like FIG. 18 is proposed.

Figure 18:
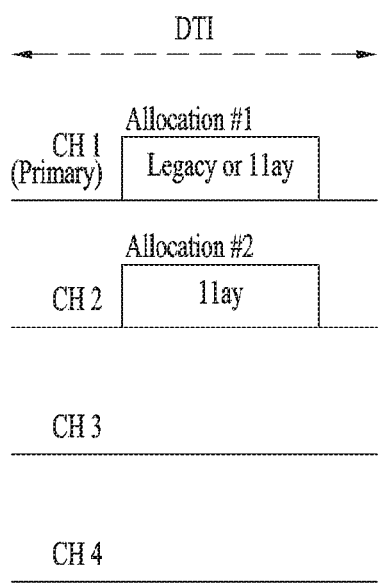
FIG. 18 is a diagram showing a case that a channel (e.g., CH2) not including a primary channel on a system is allocated to a specific (11ay) STA.

FIG. 18 is a diagram showing a case that a channel (e.g., CH2) not including a primary channel on a system is allocated to a specific (11ay) STA. As shown in FIG. 18, Allocation #2 can be allocated to a specific STA during a DTI.

The example shown in FIG. 18 is just an example proposed to describe an operation according to the present invention. An operation proposed by the present invention can be extended and applied to a case that a channel having a maximum bandwidth supportable by an allocation is included.

Hereinafter, in case that one or more channels are allocated to an STA like the above description, an NAV configuring method is described as follows. For clarity of the following description, a proposed configuration is described based on the example shown in FIG. 18.

Here, an NAV update method and a channel access method using an NAV value may follow the existing communication system.

3.1. First Example (Option 1)

Regarding a channel allocation (e.g., Allocation 1) including a primary channel, an NAV value configured by the same existing method is applicable. Namely, an NAV value determined on the basis of a signal transceived through the primary channel is applicable.

On the other hand, regarding a channel allocation (e.g., Allocation 2) not including a primary channel, an NAV value determined (or used) by a primary channel before allocation of one or more channels is maintained intact and then applicable to the allocated channels (e.g., channel allocation not including a primary channel). Hence, it is able to prevent signal collision between an STA transmitting/receiving data through one or more channels (e.g., channel bonding of CH1 and CH2) including a primary channel and another STA receiving allocation of one or more channels (e.g., a case that operation channels of BSS include CH3, CH4 or both of CH3 and CH4) not including the primary channel. Preferably, an STA according to the present invention can apply an NAV value remaining for a primary channel on a system until a channel allocation timing as an NAV initial value applied to a channel indicated as an alternative primary channel during a channel allocation period. And, the STA may update the NAV value with reference to the alternative primary channel.

Figure 19:
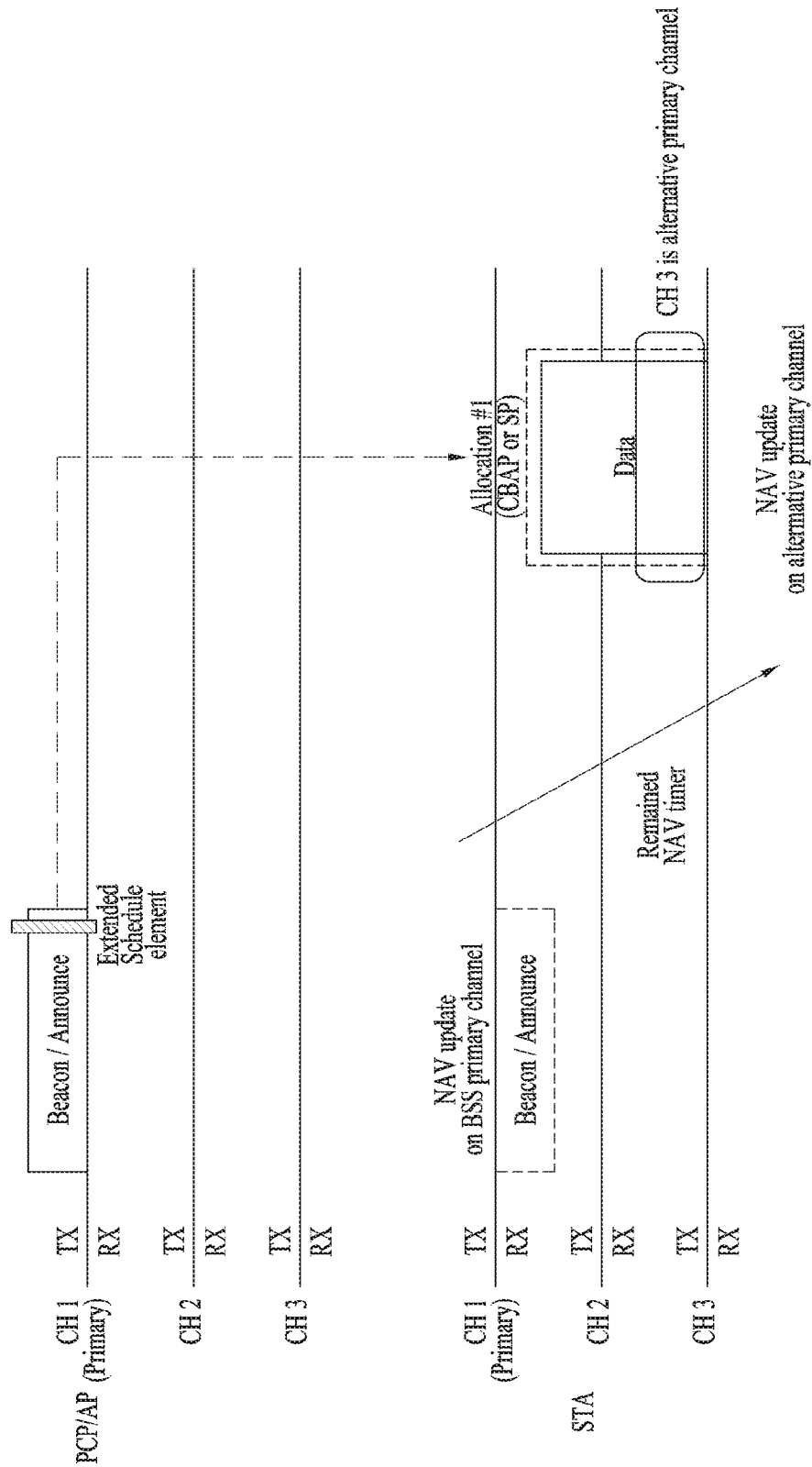
FIG. 19 is a diagram showing a method of configuring and updating NAV in case that a plurality of channels not including a primary channel are allocated.

FIG. 19 is a diagram showing a method of configuring and updating NAV in case that a plurality of channels not including a primary channel are allocated.

Referring to FIG. 19, in case that channels including CH2 and CH3 are allocated to a specific STA, one of the two channels may be utilized as an alternative primary channel operating in the same manner of a primary channel on a system during a channel allocation period. To this end, in case of receiving channel allocation information, the specific STA may receive information on the alternative primary channel as well.

In doing so, the specific STA may set an NAV value for the primary channel on the system as the channel allocation period timing to an NAV initial value for the allocated channels (CH2 and CH3). Or, the specific STA may set the NAV value for the primary channel on the system at a previous channel allocation period timing to an NAV initial value for an alternative primary channel (e.g., CH3) selected from the allocated channels (CH2 and CH3).

Hence, in the former case (e.g., a case that NAV initial value for all the allocated channels is set), the specific STA can perform both physical carrier sensing (e.g., energy detection based CCA) and virtual carrier sensing (e.g., NAV) on all of the allocated channels.

OR, in the latter case (e.g., a case that an NAV initial value for a channel indicated as an alternative primary channel among allocated channels is set), the specific STA can perform carrier sensing of simultaneously performing signal detection and energy detection, Clear Channel Assessment (CCA), NAV update, backoff and the like through the alternative primary channel during the channel allocation period but perform CCA and carrier sensing only on the rest of channels except the alternative primary channel. Particularly, the specific STA can perform both physical carrier sensing (e.g., energy detection based CCA) and virtual carrier sensing (e.g., NAV) on the alternative primary channel during the channel allocation period but perform the physical carrier sensing on the rest of channels except the alternative primary channel only.

Here, although FIG. 19 proposes total 3 channels for example, the configuration proposed by the present invention is applicable to a system supportive of total 6 to 8 channels.

The configuration shown in FIG. 19 is described in detail as follows.

First of all, the STA can perform carrier sensing and CCA through a primary channel (e.g., CH1) on a system until receiving allocation of the channel and perform NAV configuration and update.

In doing so, a PCP/AP may allocate multiple channels including CH2 and CH3 to the STA through a signal (e.g., an extended Schedule element of a beacon/announcement frame or a grant frame) transmitted through the primary channel (e.g., CH1 of FIG. 19) on the system. At the same time, the PCP/AP can transmit information indicating an alternative primary channel (e.g., CH3) usable as a primary channel during a channel allocation period to the STA.

In this case, despite that CH2 and CH3 are allocated to the STA, since an NAV value for the CH2 and cH3 is not configured yet, it is necessary to newly configure an NAV value for the CH2 and CH3. Here, the present invention proposes a method of setting an NAV value remaining for CH1 before allocating Ch2 and CH3 to the STA as the NAV value for the CH2 and CH3. Or, the present invention proposes a method for the STA to apply a remaining value configured on a BSS primary channel before receiving channel allocation as an initial NAV value applied to a channel indicated as a primary channel among the allocated channels.

In brief, while an STA configures and updates an NAV for a primary channel on a system before receiving channel allocation, if channels not including the primary channel are allocated, the STA can set an NAV value remaining for the primary channel as an NAV initial value for the allocated channel (preferably, a channel indicated as an alternative primary channel among the allocated channels). Subsequently, the STA can update an NAV value by performing CCA, carrier sensing and the like with reference to the channel indicated as the alternative primary channel.

Accordingly, an STA performs full carrier sensing including physical carrier sensing and virtual carrier sensing on a primary channel on a system only before receiving channel allocation but performs physical carrier sensing on a channel other than the primary channel only. Thereafter, if one or more channels not including the primary channel are allocated to the STA, the corresponding STA can set a remaining NAV value configured for the primary channel as an NAV initial value for a channel indicated as an alternative primary channel during a channel allocation period, perform full carrier sensing on the alternative primary channel, and update an NAV.

In particular, if one or more channels not including a primary channel are allocated to the STA, the corresponding STA can perform full carrier sensing on all the allocated channels or a channel indicated as an alternative primary channel among the allocated channels during the channel allocation period. At the same time, the STA can configure and update an NAV.

Through the above-described method, an STA can resolve signal transmission/reception collisions with other STAs.

3.2. Second Example (Option 2)

According to a second example of the present invention, a method of independently operating an NAV value per channel or bandwidth is proposed. In this case, only if an NAV value for each channel or bandwidth becomes '0', an STA can transmit/receive a signal through the corresponding channel or bandwidth.

An NAV value can be independently operated per channel supported by a BBS. Or, a single NAV value may be operated by updating or modifying an NAV value for an allocated channel or a channel in use.

3.3. Third Example (Option 3)

According to a third example of the present invention, a method of newly configuring an NAV value according to an allocated bandwidth is proposed. For example, an STA according to the present invention may operate an NAV value on a channel designated as an alternative primary channel only or independently operate an NAV on each channel existing on an allocated full bandwidth. Moreover, the STA may newly designate and operate an NAV corresponding to the allocated full bandwidth entirely.

3.4. Fourth Example (Option 4)

According to a fourth example of the present invention, when a PCP/AP allocates channels usable for data transmission to UEs, the PCP/AP can signal information on NAV settings to an STA through a beacon/announcement/grant frame.

For example, a PCP/AP can inform an STA of an offset value of an NAV value applied to a channel allocated with reference to an NAV value set for a primary channel. Hence, the STA can apply a random NAV value to the allocated channel by applying the received offset value to the NAV value used for the primary channel.

For another example, a PCP/AP can independently designate a new NAV value to an STA per channel or bandwidth.

All the examples mentioned in the foregoing description are applicable by being combined through signaling by a PCP/AP.

Like the aforementioned various examples, the present invention proposes a signal transmitting/receiving method for, even if channels not including a primary channel on a system are allocated to specific STA(s), preventing signal collision with another STA.

A PCP/AP allocates one or more channels to STA(s) intending to transmit/receive signals. To this end, the STA(s) can receive information on one or more allocated channels from the PCP/AP. In doing so, the STA(s) according to the present invention can receive information on the one or more allocated channels not including a primary channel on a system from the PCP/AP.

Here, the information on the allocated channel may be transmitted through a beacon frame, an announcement frame or a grant frame. As a detailed operation of transmitting relevant information through each frame is mentioned in the foregoing description, details shall be omitted from the following description.

Subsequently, the STA(s) according to the present invention determines an initial value of a Network Allocation Vector (NAV) for the one or more allocated channels. In this case, as the initial value of the NAV, an NAV value set for the primary channel on the system immediately before the period of allocating the one or more allocated channels is applicable.

Here, the initial value of the NAV may be set for all of the one or more allocated channels or a channel designated as an alternative primary channel among the one or more allocated channels.

For example, if the initial value of the NAV is set for all the one or more allocated channels, the STA can perform physical carrier sensing and virtual carrier sensing on all the one or more allocated channels and update the NAV value using all the one or more allocated channels.

For another example, if the initial value of the NAV is set for the channel indicated as the alternative primary channel among the one or more allocated channels, the STA can perform physical carrier sensing and virtual carrier sensing on the alternative primary channel, update the NAV value using the alternative primary channel, and perform physical carrier sensing only on the allocated channel that is not the alternative primary channel.

Through such an operation, the STA can transceive a signal with another STA through the one or more allocated channels during the period, in which the one or more channels are allocated, based on the NAV. In this case, the transmission/reception of the signal can be performed if the NAV value becomes 0.

Here, the signal transceiving STA may include both an AP STA and a non-AP STA.

4. Device Configuration

Figure 20:
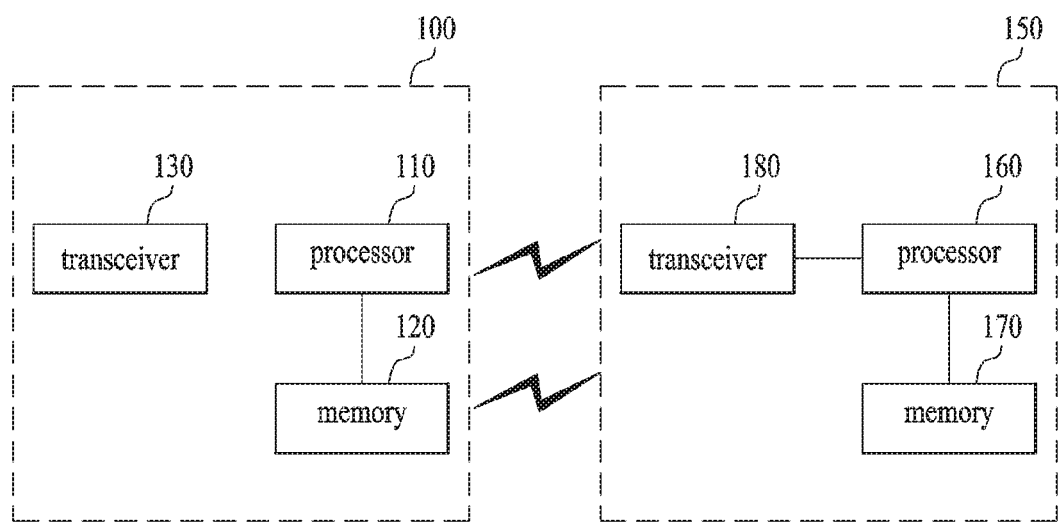
FIG. 20 is a diagram to describe the above-described method.

FIG. 20 is a diagram for explaining a device for implementing the aforementioned method.

A wireless device 100 shown in FIG. 20 corresponds to the STA configured to transmit a signal using the EDMG Header-A field and a wireless device 150 may correspond to the STA configured to receive a signal using the EDMG Header-A field. In this case, each of the STAs may correspond to 11ay terminal or PCP/AP. In the following, for clarity, the STA configured to transmit a signal is referred to as a transmitting device 100 and the STA configured to receive a signal is referred to as a receiving device 150.

The transmitting device 100 includes a processor 110, a memory 120, and a transceiver 130 and the receiving device 150 can include a processor 160, a memory 170, and a transceiver 180. The transceiver 130/180 transmits/receives a radio signal and can be implemented in physical layer such as IEEE 802.11/3GPP. The processor 110/160 is executed in physical layer and/or MAC layer and is connected with the transceiver 130/180.

The processors 110 and 160 and/or the transceivers 130 and 180 may include application specific integrated circuits (ASICs), other chipsets, logic circuits, and/or data processors. The memories 120 and 170 may include a read-only memory (ROM), a random access memory (RAM), a flash memory, a memory card, a storage medium and/or other storage units. When an embodiment is executed by software, the method described above may be executed as a module (e.g., a process, a function) that performs the functions described above. The module may be stored in the memory 120,170 and executed by the processor 110,160. The memory 120, 170 may be located inside or outside the processor 110, 160 and may be connected to the processor 110, 160 by a well-known means.

The detailed description of preferred embodiments of the invention set forth above is provided to enable those skilled in the art to implement and practice the invention. Although the present invention has been fully described by way of example with reference to the accompanying drawings, it is to be understood that various modifications and changes may be made in the invention without departing from the scope and spirit of the invention. Accordingly, the present invention is not intended to be limited to the embodiments disclosed herein but is to be accorded the widest scope consistent with the principles and novel features disclosed herein.

INDUSTRIAL APPLICABILITY

The present invention has been explained under the assumption that the present invention is applied to IEEE 802.11 based wireless LAN system, by which the present invention may be non-limited. The present invention can be applied to various wireless systems capable of transmitting data based on channel bonding using the same scheme.

What is claimed is:

1. A method of transmitting a signal by a first station (STA) to a second STA in a wireless local area network (WLAN) system, the method comprising:
  receiving, from an Access Point (AP) via a primary channel:
    first information related to a plurality of allocated secondary channels not including the primary channel, and
    second information for configuring an alternative primary channel among the plurality of allocated secondary channels;
  obtaining an initial value of a first Network Allocation Vector (NAV) for the alternative primary channel; and
  transmitting, via the alternative primary channel, the signal to the second STA during a period for the alternative primary channel based on the NAV,
  wherein the initial value of the NAV is a remaining NAV for the primary channel immediately before the first information and the second information are received, and
  wherein the initial value of the NAV is only used for the alternative primary channel and any NAV is not configured for remaining allocated secondary channels except for the alternative primary channel among the plurality of allocated secondary channels,
  wherein the alternative primary channel is a channel capable of performing both physical carrier sensing and virtual carrier sensing during a period for the alternative primary channel,
  wherein the remaining allocated secondary channels are channels capable of only physical carrier sensing,
  wherein the physical carrier sensing includes energy detection based Clear Channel Assessment (CCA), and
  wherein the virtual carrier sensing includes NAV updating and a NAV back-off count.

2. The method of claim 1, wherein the signal transmission to the second STA is performed when the first NAV value becomes 0.

3. The method of claim 1, wherein the first information and the second information are transmitted via a beacon frame, an announcement frame or a grant frame.

4. A station for transmitting a signal in a wireless local area network (WLAN) system, the station comprising:
  a transceiving unit including a transceiver configured to transceive the signal with a different station by having one or more Radio Frequency (RF) chains; and
  a processor configured to process the signal transceived with the different station by being connected to the transceiving unit,
  wherein the processor is further configured to:
    receive, from an Access Point (AP) via a primary channel:

first information related to a plurality of allocated secondary channels not including the primary channel, and second information for configuring an alternative primary channel among the plurality of allocated secondary channels;

obtain an initial value of a Network Allocation Vector (NAV) for the alternative primary channel; and transmit, via the alternative primary channel, the signal to the different station during a period for the alternative primary channel based on the NAV, wherein the initial value of the NAV is a remaining NAV for the primary channel immediately before the first information and the second information are received, and wherein the initial value of the NAV is only used for the alternative primary channel and any NAV is not configured for remaining allocated secondary channels except for the alternative primary channel among the plurality of allocated secondary channels, wherein the alternative primary channel is a channel capable of performing both physical carrier sensing and virtual carrier sensing during a period for the alternative primary channel, wherein the remaining allocated secondary channels are channels capable of only physical carrier sensing, wherein the physical carrier sensing includes energy detection based Clear Channel Assessment (CCA), and wherein the virtual carrier sensing includes NAV updating and a NAV back-off count.

* * * * *